Aug. 29, 1950     T. R. FINKE     2,520,497
CONTACT FOR SMALL DIAMETER TELESCOPIC ANTENNAS
Filed May 14, 1947

INVENTOR.
THEODORE R. FINKE
BY
Kwis, Hudson, Boughton & Williams
ATTORNEYS

Patented Aug. 29, 1950

2,520,497

UNITED STATES PATENT OFFICE 2,520,497

CONTACT FOR SMALL DIAMETER TELESCOPIC ANTENNAS

Theodore R. Finke, Euclid, Ohio, assignor to The Gabriel Company, Cleveland, Ohio, a corporation of Ohio Application May 14, 1947, Serial No. 748,047

11 Claims. (Cl. 250—33)

This invention pertains to telescoping rod assemblies such as, but not limited to, collapsible radio antennas or the like and, more particularly, to means for limiting the length of the telescoping movement and/or providing a continuous sliding electrical connection and frictional engagement between the members of the assembly.

An object of the invention is the provision of a new and improved telescoping rod assembly of the type used in, but not limited to, collapsible radio antennas, comprising an inner and an outer member having a relatively minute clearance therebetween, the inner member having a simply and easily manufactured enlargement or stop for preventing separation of the members and/or an inner end of reduced diameter to provide clearance from the inner wall of the outer member for mounting a simple, cheap, and readily assembled resilient member which may frictionally and electrically engage the outer member for retaining the members in any desired position and providing a continuous positive sliding electrical contact therebetween.

Another object of the invention is the provision of a new and improved means for providing a clearance between the opposed walls of a pair of inner and outer telescoping members for mounting an end or ends of a resilient member adapted to provide electrical and frictional engagement between the members, the inner member of the pair of telescoping members having its inner or telescoping end reduced in diameter and the end or ends of the resilient member extending along and fixed to the portion of reduced diameter.

Another object of the invention is the provision of a new and improved radio antenna construction comprising at least a pair of inner and outer telescoping members having a minimum of clearance therebetween, the inner or telescoping end of the inner member being reduced in diameter to provide an increased clearance between the inner and outer members for receiving the ends of a springlike member formed of a thin ribbon of resilient material and enabling same to be mounted on the end of reduced diameter while other portions resiliently engage the outer member.

Another object of the invention is the provision of a new and improved means for providing an electrical and frictional contact between a pair of inner and outer telescoping members, the means comprising a resilient member formed from a strip of ribbonlike material to a U or looped shape with the ends thereof mounted on the inner member whereby a satisfactory contact may be obtained using extremely thin strips of material.

Another object of the invention is the provision of a new and improved telescoping rod assembly of the type referred to, comprising an outer member having adjacent its telescoping end an inwardly extending abutment, and an inner member of hollow tubular construction into the telescoping end of which one end of a pin extends and is supported, the pin providing for the inner member a stop for engaging the abutment on the outer member and a portion of reduced diameter for receiving and supporting resilient members for electrically contacting the outer member.

Another object of the invention is the provision of a novel and improved collapsible radio antenna comprising at least a pair of telescoping tubular members, including an inner member, an outer member, a pin fixed at one end to the telescoping end of the inner member, and a looped resilient electrical contact member supported on the other end of the pin and in sliding mechanical and electrical contact with the inner walls of the outer member, the last mentioned end of the pin being reduced in diameter for providing an increased clearance from the inner walls of the outer member to receive the ends of the looped resilient contact member, the end of reduced diameter extending adjacent the base of the loop for preventing damage thereto upon complete collapsing of the radio antenna.

Another object of the invention is the provision of a new and improved telescoping rod assembly of the type used in collapsible radio antennas, comprising inner and outer telescoping members, and a resilient member for electrically and frictionally engaging the outer member, the telescoping end of the inner member having provision for fixedly supporting the resilient member utilizing the resilience of the contact member, and rendering the use of soldering or other welding processes unnecessary.

Another object of the invention is the provision of a new and improved telescoping rod assembly of the type used in collapsible radio antennas, comprising inner and outer telescoping members and a resilient contact member mounted on the inner member for frictionally and electrically engaging the outer member, wherein the normal clearance between the opposed walls of the telescoping members is not sufficient to receive or permit mounting of an end or ends of the resilient contact member on the outer surface of the inner member, the telescoping end of the inner member being reduced slightly in diameter to provide increased clearance and the resilient contact member comprising a looped ribbonlike resilient material wide enough to be easily handled and fixed to the inner member and thin enough for the ends of the loop to extend into the increased clearance without the edges engaging the outer member, the looped shape providing high mechanical pressure on the outer member notwithstanding the thinness of the material.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which.

Figure 1:
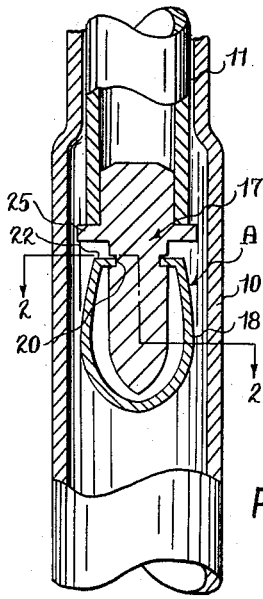
Fig. 1 is a fragmentary sectional view greatly enlarged of a telescoping rod assembly, such as used in collapsible radio antennas, showing a preferred construction embodying the present invention.

While the present invention is adaptable for use on any type of telescoping rod assembly wherein a stop and/or an electrical contact between the telescoping members is required, it is particularly adaptable for use on rodlike or tubular radio antennas of the telescoping or collapsible type, and is shown in Fig. 1 as embodied in a lower or outer elongated tubular-like member 10 and an inner or upper elongated tubular-like member 11 comprising the radio antenna, which members as shown are telescopically arranged. The outer diameter of the inner or upper member 11 is somewhat less than the inner diameter of the outer or lower member 10 such as to provide through a plurality of lengths of members similar to the members 10, 11 a generally tapering or reduction in diameter upwardly, as well as to allow physical clearance between the opposed walls of the members. The differences in the above referred to diameters may in the present embodiment be extremely small, smaller in fact than has heretofore been conventional practice in the usual collapsible antenna assemblies. The differences in diameter shown in the drawings are exaggerated for the purposes of clarity of illustration.

With telescoping rod assemblies of the type referred to, it is generally desirable to provide abutments or stops or the like to limit the length of the telescoping movement either on retraction or extension, or both, and with respect to limiting the extending movement, the walls of the telescoping end of the outer member 10 are forced or turned slightly inwardly by a spinning or swaging operation to define an opening of a diameter generally the same as the outer diameter of the upper member 11, to provide an abutment or stop 13 for coaction with another stop on the inner member 11 for preventing disassembly of the members, as well as to provide an attractive and commercially presentable antenna structure.

It is also desirable to provide a positive means of making sliding electrical contact between the upper member 11 and the lower member 10, as well as providing sufficient friction between the members to maintain them in any adjusted position, which means as shown comprise a resilient contact member or members, indicated generally in the preferred and modified constructions by the reference character A, preferably formed from a thin narrow strip of resilient or flexible springlike material such as phosphor bronze or the like. It is generally desirable from a cost of manufacture standpoint and ease of assembly to have at least one end of the contact member or members fixed to and movable with the inner or upper member 11 with another portion in resilient sliding engagement with the inner wall of the outer member 10. It is also preferred to have the fixed end of the contact member A extend intermediate the outer surface of the inner or upper member 11 and the inner surface of the lower member 10, whereby it may be easily fixed to the latter. With such a construction, however, because of the necessary width and thickness of the contact member or members and the relatively small spacing between the two walls in their normal diameter, and particularly so in the present embodiment where the normal spacing is extremely small being on the order of .005 inch, it is necessary to reduce the diameter of the end of the inner member 11 to which the contact member will be fixed to provide an increased clearance therefor. As shown in the figures, the invention contemplates effecting the reduction in the wall diameter by at least two different means.

In the preferred embodiment of the invention shown in Fig. 1, a solid elongated pin 17 is fixed to the lower end of the upper or inner member 11 and forms an extension thereof, the extending or lower end of which pin may have a diameter less than the outer diameter of the inner or upper member 11. The diameter may be of any amount less than the outer diameter of the inner member 11, dependent upon the width and thickness of the material of the contact member A to be used, but as shown in Fig. 1 has a diameter even somewhat less than the inner diameter of the member 11.

The upper end of the pin 17 may be fixed to the lower end of the member 11 by any suitable manner, such as by welding, soldering, or otherwise, but in the embodiment shown the open end has a diameter approximately the same as the inner diameter of the lower end of the member 11, which lower end of the pin 17 is preferably force-fitted thereinto.

Figure 2:
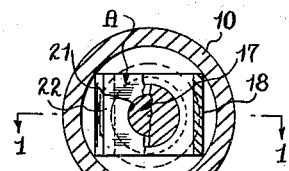
Fig. 2 is a sectional view taken approximately on the line 2—2 of Fig. 1, the relative position of the inner member of the rod assembly being shown in dot-dash lines.

The contact means may take a number of different forms, but in the preferred embodiment comprises a pear or tear shaped loop member 18 formed from a flat narrow strip of springy material, the sides of which loop slidingly engage the inner wall of the outer member 10, providing a firm, continuous, and slidable electrical and frictional contact therewith. The ends of the loop may be fixed to the reduced diameter portion of the pin 17 in any suitable manner, such as by welding, soldering, or otherwise, but in the preferred embodiment a circumferential groove 20 is formed in the pin 17 spaced from the lower end thereof, and the ends of the loop contact member 18, which as shown extend along the sides of the pin below the groove 20, terminate in inwardly extending opposed flanges 22, the ends of which flanges are shown in Figs. 1 and 2 positioned in the groove 20. The ends of the flanges 22 are inwardly curved or concave as at 21 so as to snugly fit the base of the groove. The width of the groove is preferably made only wide enough to receive the flanges 22, thus preventing endwise play with the contact member 18.

Figure 3:
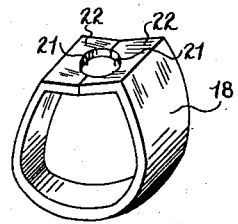
Fig. 3 is an elevational perspective view of a springlike member such as is shown in assembled relationship in Figs. 1 and 2.

As shown in Fig. 3, the loop contact member 18 is preferably biased so that in the normal unstressed free state before assembly on the pin 17 the ends of the flanges 22 press together, or even overlap, and when assembled in the groove 20 will firmly engage the base thereof. The lower end of the pin 17 may extend downwardly into the opening formed by the loop any desired length, but as shown extends downwardly so as to have its lower end adjacent the base of the loop whereby when the antenna members 10, 11 are collapsed to their full limit, the lower end of the pin 17 will serve as a stop preventing damage or excessive bending of the loop member 18. As shown, the lower end of the pin 17 is ogive shaped to fit the contour of the loop although it may be squared if desired.

Figure 4:
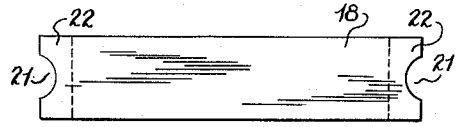
Fig. 4 is a plan view of the contact member shown in Fig. 3 before being formed to the shape thereof.
Figure 5:
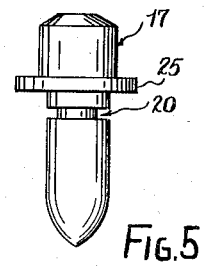
Fig. 5 is an elevational view of a pin for supporting the springlike member on the lower end of the inner member.
Figure 8:
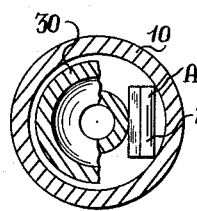
Fig. 8 is a sectional view through the antenna shown in Fig. 7 and is taken substantially on irregular line 8—8 of Fig. 7, looking in the direction of the arrows.

The looped contact member 18 may be formed by any desired process, but is preferably formed by stamping processes from a continuous strip of resilient springlike material to the shape shown in Fig. 4 and thence formed around a suitable forming die to the shape shown in Fig. 3, the diameter of the base of the loop preferably being greater than the inner diameter of the lower antenna member 10 such that when the contact member 18 is inserted into the lower antenna member 10, it will be required to flex slightly, maintaining a firm, continuous, sliding electrical and frictional contact with the inner wall of the lower antenna member 10. With the construction shown, the material from which the contact member 18 is formed may be extremely thin on the order of .005 inch or less, while still obtaining a sufficient mechanical pressure of the contact member on the inner wall of the outer member 10 to provide a noiseless sliding electrical connection and a relatively high sliding frictional engagement. The thinner material, of course, is much less subject to fatigue failure from repeated flexings as well as requiring a less reduction in diameter of the lower end of the pin 17. Further, a greater width of material for a given clearance between the lower end of the pin 17 and the outer member 10 can be utilized.

Figure 7:
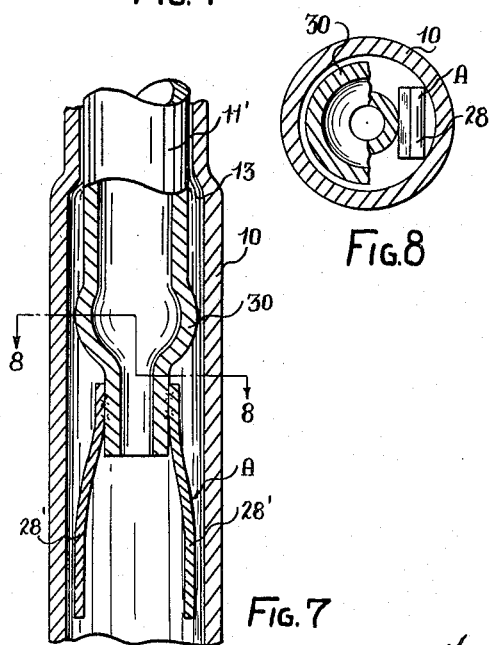
Fig. 7 is a view similar to Fig. 1, showing a still further modified construction.

It is preferred, once the antenna members 10, 11 are assembled, that provision be made to prevent disassembly, and for this purpose a stop or abutment for the inner member 11 to coact with the abutment or shoulder 13 is provided. In the preferred embodiment, the pin 17 has a radial flange 25 spaced from its lower end, the outer diameter of which flange is preferably slightly greater than the outer diameter of the inner member 11 and slightly less than the inner diameter of the lower member 10 so as to have a snug sliding fit therein and engage the abutment or shoulder 13 previously referred to formed on the upper end of the lower tube member 10 upon extension of the antenna members. It will be appreciated that other stop means could be provided such as by outwardly flaring the lower end of the inner member 11 or the walls thereof as is shown in Fig. 7, reference to which figure will presently be made. If, for any reason, it is preferred that the antenna members 10, 11 be freely separable, the flange 25 may be omitted.

Figure 6:
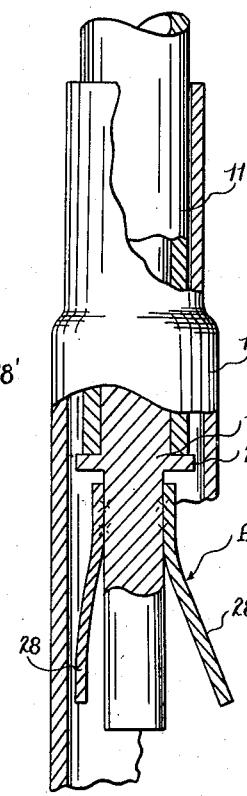
Fig. 6 is a view similar to Fig. 1, showing a modified construction.

Figs. 6 and 7 show modified constructions of the preferred embodiment of the invention shown in Figs. 1 to 5, like parts being referred to by the same numbers and similar parts being referred to by the same number with a prime mark added. In the embodiment of the invention shown in Fig. 6, the upper end of the pin 17' is inserted in the lower end of the inner antenna member 11 in the same manner as in the preferred embodiment and a flange 25' spaced from the lower end is also provided for engaging the shoulder 13 and preventing disassembly of the members 10, 11. The lower end of the pin 17' below the flange 25' is reduced in diameter and a pair of short curved contact arms 28 are fixed thereto by welding or otherwise, which arms as shown diverge in a downward direction from the pin 17' into resilient sliding electrical and frictional contact with the inner walls of the lower antenna member 10. In Fig. 6, the right hand wall of the lower antenna member 10 is broken away to show the normal unflexed position of the contact arms 28. In this embodiment, the material from which the contact arms are made will generally be thicker than the thickness of the material referred to with respect to the preferred embodiment. The lower end of the pin 17' preferably extends below the ends of the contact arms whereby, when the antenna members are collapsed, the lower end of the pin 17' may engage a suitable stop (not shown) or otherwise in the lower end of the antenna member 10 and prevent damage to or bending of the contact arms 28.

In the modified construction shown in Fig. 7, instead of providing a pin as is shown in the preferred embodiment, the lower end of the upper antenna member 11' is reduced in diameter by swaging, machining, or otherwise to provide clearance for the fixed end of the contact arms between the outer wall of the upper antenna member 11' and the inner wall of the lower antenna member 10. In this embodiment, contact arms 28' of the same type as shown in Fig. 6 are employed. It will be appreciated, however, that a loop similar to that shown in the preferred embodiment may be utilized. In this respect, should a loop member be employed, the ends of the loop might be welded or soldered to the portion of reduced diameter, or a groove similar to that shown in Figs. 1 and 2 might be formed in the wall of the member 11' adjacent the end thereof and a loop member similar to that shown in the preferred embodiment employed.

For providing a stop to prevent disassembly of the antenna members 10, 11', the walls of the member 11' at a point spaced from the lower end are flared outwardly a short distance as at 30 by suitable machining operations, thus providing a stop and a portion of reduced diameter for mounting the contact members integral with the inner antenna member 11'. Alternatively, a separately formed ring appropriately dimensioned could be positioned on the portion of reduced diameter for providing the stop. If desired, the length of the portion of reduced diameter on the inner antenna member 11' may be made of a greater length than shown to extend beyond the lower end of the contact arms and provide a stop when the antenna members 10, 11' are collapsed to their full extent for reasons referred to with reference to the modified construction shown in Fig. 6.

It will be appreciated that other modified constructions could be employed for providing a combined stop and contact mounting surface in the lower end of the inner antenna member 11, such as by flattening the lower end of the inner antenna member 11 in one dimension and forming an enlargement in the transverse dimension, the enlargement providing a stop and the flattened portion providing a surface to which the fixed ends of a looped contact member or members may be welded, soldered, or otherwise supported.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

Having thus described my invention, I claim:

1. An extensible antenna comprising elongated telescoping members, the inner of said members having one of its ends projecting beyond one of the ends of the outer member, said inner member being formed with a major portion of substantial length and greater diameter and extending from said projecting one end thereof to adjacent the other end thereof and with a minor portion of lesser diameter and of relative short length compared with said major portion and extending to said other end of the inner member, said outer member having an internal diameter approximately on the order of .005 inch greater than the diameter of the major portion of the inner member to provide relatively slight clearance between said members substantially throughout their telescoping lengths, said outer member adjacent said one end thereof having an internal shoulder facing toward the other end thereof and spaced radially outwardly from the circumference of said inner member, said inner member intermediate the major and minor portions thereof being provided with an outwardly projecting portion extending beyond the circumference of the major portion of said inner member but spaced inwardly from the interior of the outer member and adapted to engage said shoulder to limit extension of said members, and flexible means of electrically conductive material secured to said minor portion of the inner member and extending toward the free end of said portion and outwardly bowed to constantly and frictionally engage the interior of the outer member.

2. An extensible antenna as defined in claim 1 and wherein said minor portion of the inner member is separate from but is secured to the major portion of said inner member.

3. An extensible antenna as defined in claim 1 and wherein said minor portion of the inner member is in the form of a pin secured to the major portion of the inner member.

4. An extensible antenna as defined in claim 1 and wherein said minor portion of the inner member in in the form of a pin secured to the major portion of the inner member while said outwardly projecting portion of the inner member is in the form of a radial projection on said pin and located adjacent to the major portion of the inner member.

5. An extensible antenna as defined in claim 1 and wherein said minor portion of the inner member is in the form of a pin secured to the major portion of said inner member while said outwardly projecting portion of the inner member is in the form of an outwardly extending annular flange on said pin and located adjacent to the major portion of the inner member.

6. An extensible antenna as defined in claim 1 and wherein said minor portion of the inner member is separate from but is secured to the major portion of said inner member and is provided adjacent said major portion with a recess in which said flexible means engages.

7. An extensible antenna as defined in claim 1 and wherein said minor portion of said inner member is provided with a peripheral recess while said flexible means is substantially U-shaped and embraces the free end of said minor portion and is provided with inwardly extending flanges engaging in said peripheral recess at diametrically opposite points of said minor portion.

8. An extensible antenna as defined in claim 1 and wherein said major portion of the inner member at its inner end is hollow while said minor portion of said inner member is in the form of a pin having a part interfitting the hollow inner end of the major portion and being provided with a radial annular flange which abuts the inner end of the major portion.

9. An extensible antenna as defined in claim 1 and wherein the outwardly projecting portion of said inner member consists of an outwardly bowed surface on said inner member and located intermediate the major and minor portions thereof.

10. An extensible antenna as defined in claim 1 and wherein said minor portion of said inner member is in the form of a pin secured to the major portion thereof while said flexible means consists of spring strips secured to said minor portion at diametrically opposite points.

11. An extensible antenna as defined in claim 1 and wherein said flexible means consists of spring strips secured to the minor portion of said inner member at diametrically opposite points thereon.

THEODORE R. FINKE.

REFERENCES CITED

The following references are of record in the file of this patent:

UNITED STATES PATENTS

| Number | Name | Date |
|---|---|---|
| 1,909,353 | Hughes et al. | May 16, 1933 |
| 2,152,316 | Kopanski | Mar. 28, 1939 |
| 2,217,188 | Snyder | Oct. 8, 1940 |
| 2,222,527 | Boughter | Nov. 19, 1940 |
| 2,298,140 | Mace | Oct. 6, 1942 |
| 2,366,634 | Ludwig | Jan. 2, 1945 |